United States Patent
Umeyama et al.

(10) Patent No.: US 10,305,109 B2
(45) Date of Patent: May 28, 2019

(54) NONAQUEOUS ELECTROLYTE SECONDARY BATTERY AND METHOD OF MANUFACTURING THE SAME

(71) Applicant: TOYOTA JIDOSHA KABUSHIKI KAISHA, Toyota-shi, Aichi-ken (JP)

(72) Inventors: Hiroya Umeyama, Okazaki (JP); Kaoru Inoue, Hirakata (JP); Tatsuya Hashimoto, Osaka (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 349 days.

(21) Appl. No.: 15/081,190

(22) Filed: Mar. 25, 2016

(65) Prior Publication Data

US 2016/0308214 A1 Oct. 20, 2016

(30) Foreign Application Priority Data

Apr. 14, 2015 (JP) ................. 2015-082602

(51) Int. Cl.
| | |
|---|---|
| *H01M 4/62* | (2006.01) |
| *H01M 4/04* | (2006.01) |
| *H01M 4/139* | (2010.01) |
| *H01M 4/13* | (2010.01) |

(52) U.S. Cl.
CPC .......... *H01M 4/622* (2013.01); *H01M 4/049* (2013.01); *H01M 4/13* (2013.01); *H01M 4/139* (2013.01)

(58) Field of Classification Search
CPC .. H01M 4/622; H01M 4/0404; H01M 4/0471; H01M 4/049; H01M 4/139; H01M 2004/027
See application file for complete search history.

(56) References Cited

U.S. PATENT DOCUMENTS

2014/0272540 A1 9/2014 Takahata et al.

FOREIGN PATENT DOCUMENTS

| | | | | |
|---|---|---|---|---|
| CN | 103875096 A | 6/2014 | | |
| EP | 1 191 618 A1 | 3/2002 | | |
| JP | 04-342966 A | 11/1992 | | |
| JP | 07-183027 A | 7/1995 | | |
| JP | 2000294229 A | 10/2000 | | |
| JP | 2008-258055 | * 10/2008 | .............. | H01M 4/02 |
| JP | 2009-230862 A | 10/2009 | | |
| JP | 2017-21888 A | 1/2017 | | |
| KR | 10-2014-0072116 A | 6/2014 | | |

* cited by examiner

*Primary Examiner* — Osei K Amponsah
(74) *Attorney, Agent, or Firm* — Sughrue Mion, PLLC

(57) ABSTRACT

A nonaqueous electrolyte secondary battery includes: a negative electrode current collector core; and a negative electrode mixture layer that is formed on the negative electrode current collector core. The negative electrode mixture layer contains a diene rubber binder. A section of the negative electrode mixture layer in a thickness direction is divided into a first region, a second region, and a third region from a negative electrode current collector core side by trisecting the negative electrode mixture layer in the thickness direction. An abundance of the diene rubber binder in the second region is greater than an abundance of the diene rubber binder in the first region. The third region contains the diene rubber binder having an oxidized carbon-carbon double bond.

5 Claims, 10 Drawing Sheets

FIG. 11

TABLE 1

| SAMPLE No | MANUFACTURING METHOD ||||||||| NEGATIVE ELECTRODE MIXTURE LAYER ||| BATTERY CHARACTERISTICS ||||
| | FIRST STEP, SECOND STEP |||||| THIRD STEP | FOURTH STEP CORONA DISCHARGE | SECTION IN THICKNESS DIRECTION || ADHESION | LOW-TEMPERATURE PULSE CYCLE | NORMAL-TEMPERATURE DISCHARGE | HIGH-TEMPERATURE STORAGE |
| | MIXTURE COMPOSITION ||||| NV VALUE | HOT AIR DRYING TEMPERATURE | IRRADIATION ENERGY PER 1 MASS% OF BINDER | INDEX INDICATING SBR DISTRIBUTION | INDEX INDICATING C=C OXIDATION AMOUNT | | LIMITING CURRENT | IV RESISTANCE | CAPACITY RETENTION |
| | NEGATIVE ELECTRODE ACTIVE MATERIAL | CMC | SBR | | | | | | | | | | | |
| | MASS% | MASS% | MASS% | MASS% | | | °C | kJ/m² | m2/m1 | n3/n2 | — | A | mΩ | % |
| 1 | 97.5 | 1.0 | 1.5 | 58 | | | 50 | 2500 | 1.5 | 0.01 | H | 92 | 2.22 | 88.2 |
| 2 | 97.0 | 1.0 | 2.0 | 54 | | | 80 | 3750 | 2 | 0.01 | H | 92 | 2.24 | 89.6 |
| 3 | 97.0 | 1.0 | 2.0 | 54 | | | 80 | 4200 | 3 | 0.01 | H | 92 | 2.19 | 89.8 |
| 4 | 97.0 | 1.0 | 2.0 | 54 | | | 80 | 4600 | 5 | 0.01 | H | 90 | 2.17 | 89.6 |
| 5 | 97.0 | 1.0 | 2.0 | 52 | | | 80 | 1400 | 3 | 0.1 | H | 84 | 2.18 | 89.8 |
| 6 | 97.0 | 1.0 | 2.0 | 52 | | | 80 | 1000 | 3 | 0.2 | H | 82 | 2.18 | 89.8 |
| 7 | 97.0 | 1.0 | 2.0 | 52 | | | 80 | 500 | 3 | 0.5 | H | 80 | 2.18 | 89.8 |
| 8* | 97.5 | 1.0 | 1.5 | 58 | | | 80 | — | 1.5 | 1 | H | 72 | 2.22 | 88.4 |
| 9* | 97.5 | 1.0 | 1.5 | 58 | | | 50 | — | 1 | 1 | H | 76 | 2.32 | 87.0 |
| 10* | 97.5 | 1.0 | 1.5 | 58 | | | 50 | 2100 | 1 | 0.01 | H | 92 | 2.32 | 87.0 |
| 11* | 97.0 | 1.0 | 2.0 | 54 | | | 80 | — | 2 | 1 | H | 70 | 2.20 | 89.5 |
| 12 | 97.0 | 1.0 | 2.0 | 50 | | | 90 | 4800 | 6 | 0.01 | L | 86 | 2.16 | 89.4 |
| 13 | 97.0 | 1.0 | 2.0 | 52 | | | 80 | 300 | 3 | 0.7 | H | 74 | 2.19 | 90.0 |

NONAQUEOUS ELECTROLYTE SECONDARY BATTERY AND METHOD OF MANUFACTURING THE SAME

INCORPORATION BY REFERENCE

The disclosure of Japanese Patent Application No. 2015-082602 filed on Apr. 14, 2015 including the specification, drawings and abstract is incorporated herein by reference in its entirety.

BACKGROUND OF THE INVENTION

1. Field of the Invention

The present invention relates to a nonaqueous electrolyte secondary battery and a method of manufacturing the same.

2. Description of Related Art

Japanese Patent Application Publication No. 4-342966 (JP 4-342966 A) discloses a negative electrode mixture layer that contains styrene-butadiene rubber (SBR) as a binder.

In general, a negative electrode of a nonaqueous electrolyte secondary battery is manufactured using a manufacturing method including: applying a negative electrode mixture paste containing a binder such as SBR and a solvent to a core; and drying the negative electrode mixture paste. However, in this manufacturing method, when the solvent is dried, so-called binder migration, that is, a phenomenon in which the binder migrates to a surface side of a coating film may occur.

When binder migration occurs, in the dried coating film, that is, in the negative electrode mixture layer, the binder segregates on the surface side and is distributed in a film form. The binder film formed as described above inhibits penetration and diffusion of lithium (Li) ions in the negative electrode mixture layer. Further, the binder film also inhibits a storing/releasing reaction of Li ions in a negative electrode active material. As a result, it is considered that input and output characteristics of a battery decrease. Input and output characteristics described herein refer to at least one of input characteristics and output characteristics.

As the drying rate of the coating film increases, binder migration becomes severe. Therefore, in the related art, in order to suppress binder migration, the coating film is dried under mild drying conditions. However, with the above-described countermeasure, it is difficult to realize input and output characteristics more satisfactory than those of the related art.

SUMMARY OF THE INVENTION

According to an aspect of the invention, there is provided a nonaqueous electrolyte secondary battery having satisfactory input and output characteristics.

A nonaqueous electrolyte secondary battery includes: a negative electrode current collector core; and a negative electrode mixture layer that is formed on the negative electrode current collector core. The negative electrode mixture layer contains a diene rubber binder. A section of the negative electrode mixture layer in a thickness direction is divided into a first region, a second region, and a third region from a negative electrode current collector core side by trisecting the negative electrode mixture layer in the thickness direction. An abundance of the diene rubber binder in the second region is greater than an abundance of the diene rubber binder in the first region. The third region contains the diene rubber binder having an oxidized carbon-carbon double bond.

The present inventors completed the nonaqueous electrolyte secondary battery having satisfactory input and output characteristics by actively using binder migration and performing a specific surface treatment on the negative electrode mixture layer.

In described above, the first region, which is a lower layer of the negative electrode mixture layer, is a region containing an interface between the negative electrode mixture layer and negative electrode current collector core. In the first region, the abundance of the diene rubber binder is less than those in the other regions. As a result, electrons are easily exchanged between the negative electrode mixture layer and the negative electrode current collector core, and improvement of input and output characteristics, for example, at a normal temperature can be expected.

In the second region which is an intermediate layer of the negative electrode mixture layer, the abundance of the diene rubber binder is greater than that in the first region (lower layer). As a result, for example, during high-temperature storage, a side reaction between the negative electrode active material and the electrolytic solution can be suppressed. By suppressing storage deterioration of the negative electrode active material, an effect of maintaining satisfactory input and output characteristics for a long period of time can be expected.

The third region which is an upper layer of the negative electrode mixture layer is a region containing the surface of the negative electrode mixture layer. In the third region, the diene rubber binder having an oxidized carbon-carbon double bond (hereinafter, also abbreviated as "C=C bond") is present. In the binder film formed by binder migration, a portion where the C=C bond is oxidized may be a crack that allows permeation of Li ions. As a result, improvement of input and output characteristics, for example, at a low temperature can be expected.

$m2/m1$ may be 1.5 to 5 where the abundance of the diene rubber binder in the first region is represented by $m1$, and the abundance of the diene rubber binder in the second region is represented by $m2$.

By controlling $m2/m1$ to be 1.5 or higher, improvement of input and output characteristics at a normal temperature can be expected. By controlling $m2/m1$ to be 5 or lower, an effect of suppressing a decrease in the adhesion at the interface between the negative electrode mixture layer and the negative electrode current collector core can be expected.

$n3/n2$ may be 0.01 to 0.5 where an abundance per unit sectional area of a carbon-carbon double bond derived from the diene rubber binder in the second region is represented by $n2$, and an abundance per unit sectional area of a carbon-carbon double bond derived from the diene rubber binder on a surface of the third region is represented by $n3$.

$n3/n2$ is an index indicating the amount of the diene rubber binder having an oxidized C=C bond present on the surface of the third region, that is, on the surface of the negative electrode mixture layer. As the value of $n3/n2$ decreases, a larger amount of the diene rubber binder having an oxidized C=C bond is present on the surface of the negative electrode mixture layer. By controlling $n3/n2$ to be 0.5 or lower, improvement of input and output characteristics at a low temperature can be expected. By controlling $n3/n2$ to be 0.01 or higher, an effect of suppressing the peeling of the mixture from the surface of the negative electrode mixture layer can be expected.

Here, "m2/m1" or "n3/n2" described above can be measured by performing electron probe microanalysis (EPMA) after modifying the C═C bond with bromine (Br) on the section of the negative electrode mixture layer in the thickness direction or on the surface of the negative electrode mixture layer. The details of the measurement method will be described below.

The negative electrode mixture layer may contain 1.5 mass % to 2.0 mass % of the diene rubber binder. In a case where the content of the diene rubber binder is within the above-described range, input and output characteristics and adhesion are well-balanced.

In the nonaqueous electrolyte secondary battery, the diene rubber binder may contain styrene-butadiene rubber.

A method of manufacturing a nonaqueous electrolyte secondary battery includes: preparing a negative electrode mixture paste containing a diene rubber binder and a solvent; applying the negative electrode mixture paste to a negative electrode current collector core to form a coating film; drying the coating film to form a negative electrode mixture layer where the diene rubber binder segregates on a surface side; and oxidizing a carbon-carbon double bond of the diene rubber binder on the surface of the negative electrode mixture layer.

In this manufacturing method, by adjusting drying conditions during the drying of the coating film, binder migration is intentionally caused to occur, and the diene rubber binder migrates from the lower layer to the intermediate layer and the upper layer in the coating film. Here, in the coating film, the lower layer corresponds to the first region, the intermediate layer corresponds to the second region, and the upper layer corresponds to the third region.

Further, during the drying of the coating film, the C═C bond of the diene rubber binder on the surface of the negative electrode mixture layer is oxidized. As a result, in the vicinity of the surface of the negative electrode mixture layer, that is, in the third region, the diene rubber binder having an oxidized C═C bond is produced. Through the above-described steps, the above-described nonaqueous electrolyte secondary battery can be manufactured.

During the oxidation of the carbon-carbon double bond of the diene rubber binder, the surface of the negative electrode mixture layer may be irradiated with corona discharge. According to this configuration, the C═C bond of the diene rubber binder present near the surface of the negative electrode mixture layer can be easily oxidized.

An energy of the corona discharge may be, for example, 1000 kJ/m$^2$ to 4800 kJ/m$^2$ per 1 mass % of the diene rubber binder. By irradiation of corona discharge with an energy in the above-described range, the diene rubber binder present on the surface of the negative electrode mixture layer can be appropriately oxidized.

In the manufacturing method, a solid content concentration of the negative electrode mixture paste may be 50 mass % to 60 mass %.

In the manufacturing method, the diene rubber binder may contain styrene-butadiene rubber.

According to the above-described configuration, a nonaqueous electrolyte secondary battery having satisfactory input and output characteristics can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 11 is Table 1 showing the results of evaluating a nonaqueous electrolyte secondary battery.

DETAILED DESCRIPTION OF EMBODIMENTS

Hereinafter, an embodiment of the invention (hereinafter, referred to as "the embodiment") will be described in detail. However, the embodiment is not limited to the following description. In the following description, "nonaqueous electrolyte secondary battery" will be referred to simply as "battery".

<Nonaqueous Electrolyte Secondary Battery>

Figure 1:
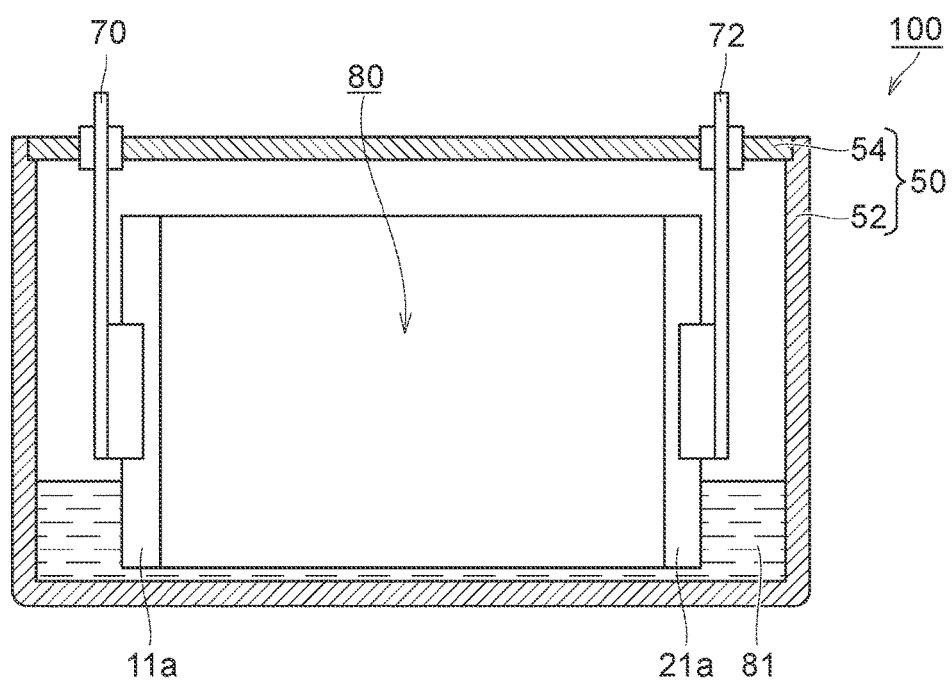
FIG. 1 is a schematic sectional view showing a configuration example.

FIG. 1 is a schematic sectional view showing a configuration example of a nonaqueous electrolyte secondary battery according to the embodiment. As shown in FIG. 1, a battery 100 includes a battery case 50. The battery case 50 has a square external shape. The battery case 50 is formed of, for example, an aluminum (Al) alloy. The battery case 50 includes a case body 52 and a lid 54. A positive electrode terminal 70 and a negative electrode terminal 72, which are external terminals, are provided on the lid 54. For example, a current interrupt device, a safety valve, and a liquid injection hole may be provided on the lid 54. The battery case 50 accommodates an electrode body 80 and an electrolytic solution 81. The electrolytic solution 81 penetrates into the electrode body 80.

[Electrode Body]

Figure 2:
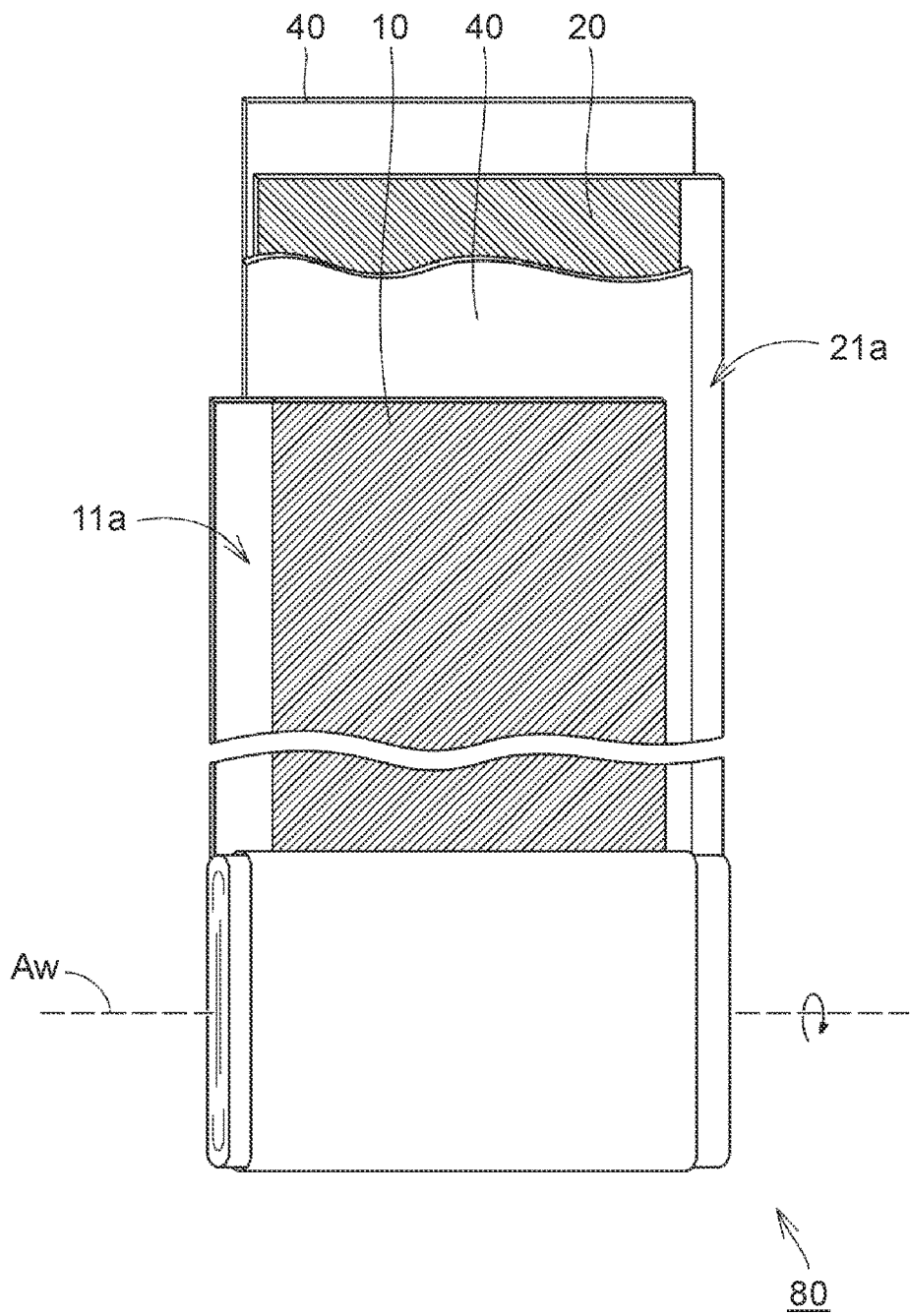
FIG. 2 is a schematic diagram showing a configuration example of an electrode body.

FIG. 2 is a schematic diagram showing a configuration example of the electrode body. As shown in FIG. 2, the electrode body 80 is a wound electrode aggregate. That is, the electrode body 80 is an electrode aggregate obtained by laminating a positive electrode 10 and a negative electrode 20 with separators 40 interposed therebetween to obtain a laminate and winding the laminate.

[Negative Electrode]

Figure 3:
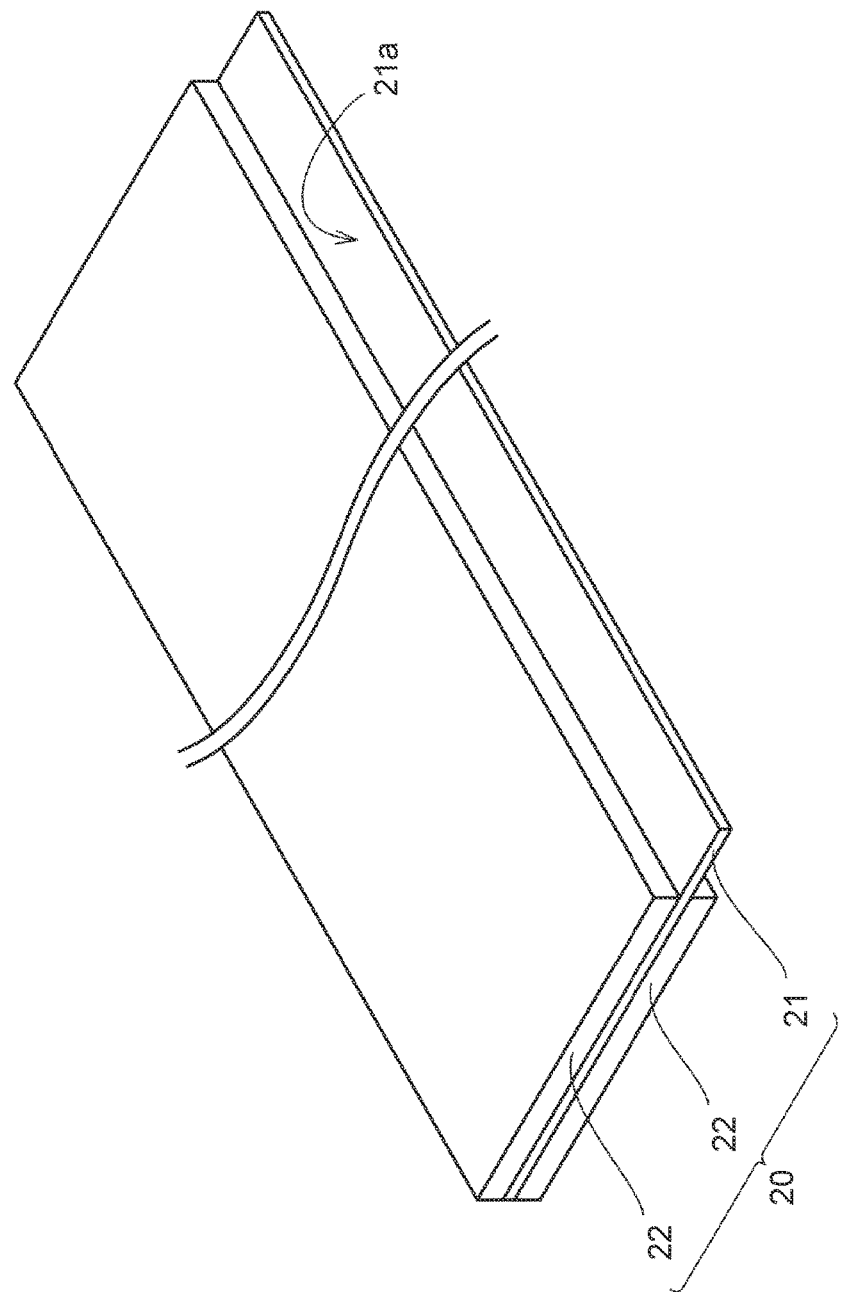
FIG. 3 is a schematic diagram showing a configuration example of a negative electrode according to an embodiment of the invention.

FIG. 3 is a schematic diagram showing a configuration example of the negative electrode. As shown in FIG. 3, the negative electrode 20 is an elongated belt-shaped sheet member. The negative electrode 20 includes: a negative electrode current collector core 21; and a negative electrode mixture layer 22 that is formed on both main surfaces of the negative electrode current collector core 21. The negative electrode current collector core 21 is, for example, a copper (Cu) foil. The thickness of the negative electrode current collector core is, for example, about 5 μm to 25 μm. In the negative electrode 20, a core exposure portion 21a where the negative electrode current collector core 21 is exposed from the negative electrode mixture layer 22 is a portion for connection with the negative electrode terminal 72 (refer to FIGS. 1 and 2).

The negative electrode mixture layer contains at least a negative electrode active material and a diene rubber binder. The thickness of the negative electrode mixture layer is, for example, about 20 μm to 200 μm, preferably about 20 μm to 100 μm, and more preferably about 20 μm to 80 μm. The negative electrode active material is not particularly limited. For example, the negative electrode active material may be a carbon negative electrode active material such as graphite or coke, or an alloy negative electrode active material containing silicon (Si), tin (Sn), and the like. The negative electrode mixture layer contains, for example, 96.5 mass % to 98 mass % of the negative electrode active material.

The diene rubber binder is a rubber binder having a carbon-carbon double bond in the main chain thereof. Examples of the diene rubber binder include styrene-butadiene rubber (SBR), butadiene rubber (BR), acrylate-butadiene rubber (ABR), acrylonitrile-butadiene rubber (NBR), isoprene rubber (IR), chloroprene rubber (CR), and a modified product, a mixture, or a copolymer thereof. Among these, SBR is particularly preferable as the diene rubber binder according to the embodiment.

The negative electrode mixture layer preferably contains 1.5 mass % to 2.0 mass % of the diene rubber binder. With the above-described content, input and output characteristics and adhesion are likely to be well-balanced. The negative electrode mixture layer may contain a thickener such as carboxymethyl cellulose (CMC). The negative electrode mixture layer may contain, for example, 0.5 mass % to 1.5 mass % of the thickener.

Figure 4:
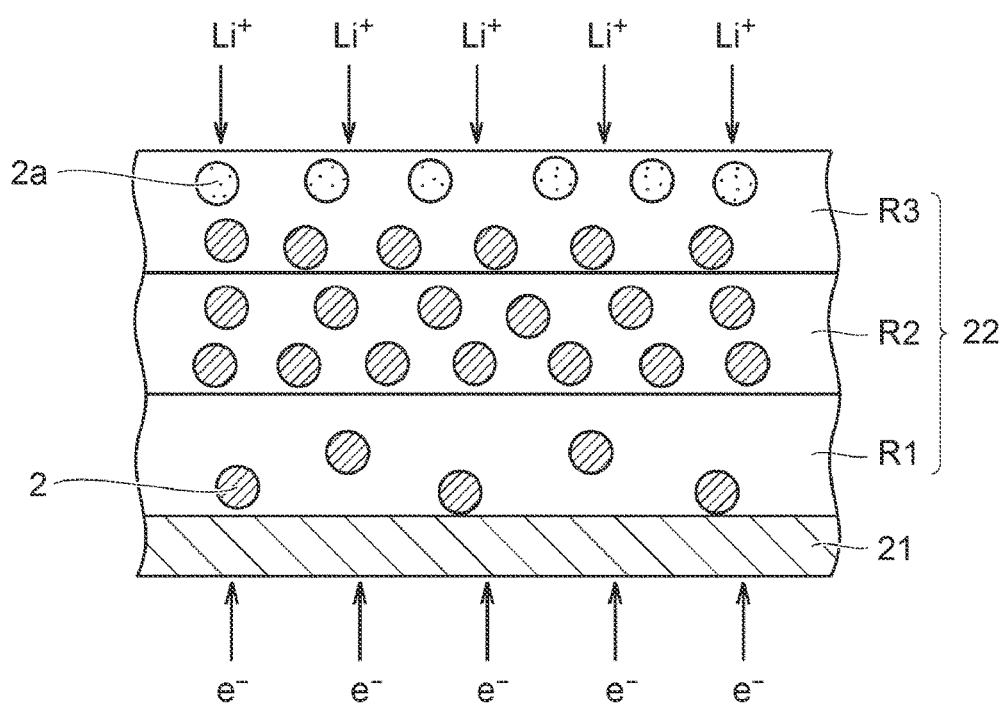
FIG. 4 is a schematic sectional view showing the configuration example of the negative electrode.

In the embodiment, the diene rubber binder has a specific distribution state in a section of the negative electrode mixture layer in a thickness direction. As a result, significant improvement of input and output characteristics can be expected. FIG. 4 is a schematic sectional view showing the section of the negative electrode mixture layer in the thickness direction. As shown in FIG. 4, in the embodiment, the section of the negative electrode mixture layer 22 in the thickness direction is divided into a first region R1, a second region R2, and a third region R3 from the negative electrode current collector core 21 side by trisecting the negative electrode mixture layer 22 in the thickness direction A diene rubber binder 2 is distributed in the first region R1, the second region R2, and the third region R3. The third region R3 further contains a diene rubber binder 2a having an oxidized C=C bond in the main chain. Here, an abundance of the diene rubber binder in the first region R1 is represented by m1, an abundance of the diene rubber binder in the second region R2 is represented by m2, and an abundance of the diene rubber binder in the third region R3 is represented by m3. In the embodiment, m2>m1 is satisfied. Preferably, m2>m3>m1 is also satisfied. In other words, in the embodiment, "m2/m1>1" is satisfied, and preferably "m2/m3>1" and "m3/m1>1" are satisfied.

By satisfying m2/m1>1 (preferably m2/m3>1 and m3/m1>1), improvement of input and output characteristics at a normal temperature can be expected. The reason for this is as follows: by reducing the content of the diene rubber binder in the first region R1, electrons (e⁻) are easily exchanged between the negative electrode mixture layer and the negative electrode current collector core. From the viewpoint of input and output characteristics at a normal temperature, m2/m1 is preferably 1.5 or higher and more preferably 2 or higher. However, it is considered that, when the content of the diene rubber binder in the first region R1 is excessively reduced, adhesion between the negative electrode mixture layer and the negative electrode current collector core is reduced. From the viewpoint of adhesion, m2/m1 is preferably lower than 6 and more preferably 5 or lower.

By satisfying m2/m1>1 (preferably m2/m3>1 and m3/m1>1), improvement of high-temperature storage characteristics can be expected. During high-temperature storage, a side reaction between the negative electrode active material and the electrolytic solution is most likely to occur in the second region R2. Therefore, by increasing the content of the diene rubber binder in the second region R2, this side reaction can be suppressed. As a result, satisfactory input and output characteristics can be maintained for a long period of time.

Further, by satisfying m2/m1>1 (preferably m2/m3>1 and m3/m1>1), improvement of safety during overcharge can also be expected. During overcharge, heat generation caused by a reaction between the negative electrode active material and the electrolytic solution is most likely to occur in the second region R2. Since a large amount of the diene rubber binder is present in the second region R2, heat generation during overcharge can be suppressed.

Here, m2/m1, m2/m3, and m3/m1 are measured according to the following steps (1) to (5).

(1) A sample having a predetermined size is cut from the negative electrode, and a cut surface of the sample is smoothened using a cross-section polisher or the like. As a result, a section of the negative electrode mixture layer in a thickness direction is obtained. At this time, it is preferable that the section in the thickness direction is parallel to the thickness direction, but it is not necessary that the section is exactly parallel to the thickness direction. For example, the section in the thickness direction may be inclined to the thickness direction by about ±5°. A collection position of the sample is not particularly limited. For example, it is preferable that the sample is collected near the center of the negative electrode mixture layer when observed from a normal direction thereof.

(2) In the section in the thickness direction, the C=C bond of the diene rubber binder is modified with Br.

(3) Using EPMA, the section in the thickness direction modified with Br is provided for area analysis to detect Br. The analysis region is adjusted to include a surface of the negative electrode mixture layer and an interface between the negative electrode mixture layer and the negative electrode current collector core. The observation magnification is, for example, about 500 times to 1500 times. Here, the detected amount of Br is proportional to the abundance of the C=C bond. Accordingly, the detected amount of Br is proportional to the abundance of the diene rubber binder.

(4) Conditions of EPMA are set, for example, as follows.
Electron beam diameter: about 1 μm
Accelerating voltage: about 15 kV
Beam current: about 50 nA
Number of pixels: about 255 pixels×255 pixels
Measurement time: about 30 msec/pixels (5) The analysis region is divided into a first region, a second region, and a third region from the negative electrode current collector core side by trisecting the analysis region in the thickness direction. m2/m1, m2/m3, and m3/m1 can be calculated from the following expressions (I) to (III).

$$m2/m1 = \text{[Detected Amount of Br in Second Region]} \div \text{[Detected Amount of Br in First Region]} \quad \text{Expression (I):}$$

$$m2/m3 = \text{[Detected Amount of Br in Second Region]} \div \text{[Detected Amount of Br in Third Region]} \quad \text{Expression (II):}$$

$$m3/m1 = \text{[Detected Amount of Br in Third Region]} \div \text{[Detected Amount of Br in First Region]} \quad \text{Expression (III):}$$

Each of the detected amounts of Br is a value per unit sectional area. The unit sectional area is set as 1 $\mu m^2$.

The third region R3, that is, the vicinity of the surface of the negative electrode mixture layer further contains the diene rubber binder 2a having an oxidized C=C bond. When it is attempted to distribute a larger amount of the diene rubber binder in the second region R2 using binder migration, a binder film is necessarily formed in the third region R3. The binder film inhibits permeation of Li ions (Li$^+$) and thus causes a decrease, particularly, in input and output characteristics at a low temperature. However, a portion where the C=C bond is oxidized allows permeation of Li ions. Accordingly, since the third region R3 contains the diene rubber binder 2a having an oxidized C=C bond, improvement of input and output characteristics at a low temperature can be expected.

The oxidized C=C bond is not modified with Br. Therefore, using the above-described Br modifying method, the amount of the diene rubber binder having an oxidized C=C bond in the third region can also be estimated. Specifically, through the following steps (1) to (4), the amount of the diene rubber binder having an oxidized C=C bond can be estimated.

(1) The C=C bond on the surface of the negative electrode mixture layer is modified with Br.

(2) Using EPMA, area analysis of the surface of the negative electrode mixture layer (the surface of the third region) modified with Br is conducted to calculate the detected amount of Br per unit area. The observation magnification is, for example, about 500 times to 1500 times. The detected amount of Br is represented by n3. The unit area is set as 1 $\mu m^2$.

(3) The detected amount of Br in the second region measured as described above, that is, the detected amount of Br (m2) in the second region per unit sectional area is represented by n2.

(4) n3 is divided by n2 to calculate n3/n2.

When the oxidized diene rubber binder 2a is present in the third region R3, n3/n2 is lower than 1. As the amount of the oxidized diene rubber binder 2a present in the third region R3 increases, n3/n2 decreases. As this value decreases, improvement of input and output characteristics at a low temperature can be expected. n3/n2 is preferably 0.7 or lower, more preferably 0.5 or lower, and still more preferably 0.2 or lower. However, when n3 is zero, a problem such as peeling of the mixture from the surface of the negative electrode mixture layer may also be expected. Accordingly, n3/n2 is preferably 0.01 or higher.

It is preferable that the first region R1 and the second region R2 do not contain the diene rubber binder having an oxidized C=C bond. When the diene rubber binder in the first and second regions is oxidized, the negative electrode mixture layer is embrittled, and the peeling of the mixture is likely to occur. A method of oxidizing only the third region R3 will be described below.

[Positive Electrode]

Figure 5:
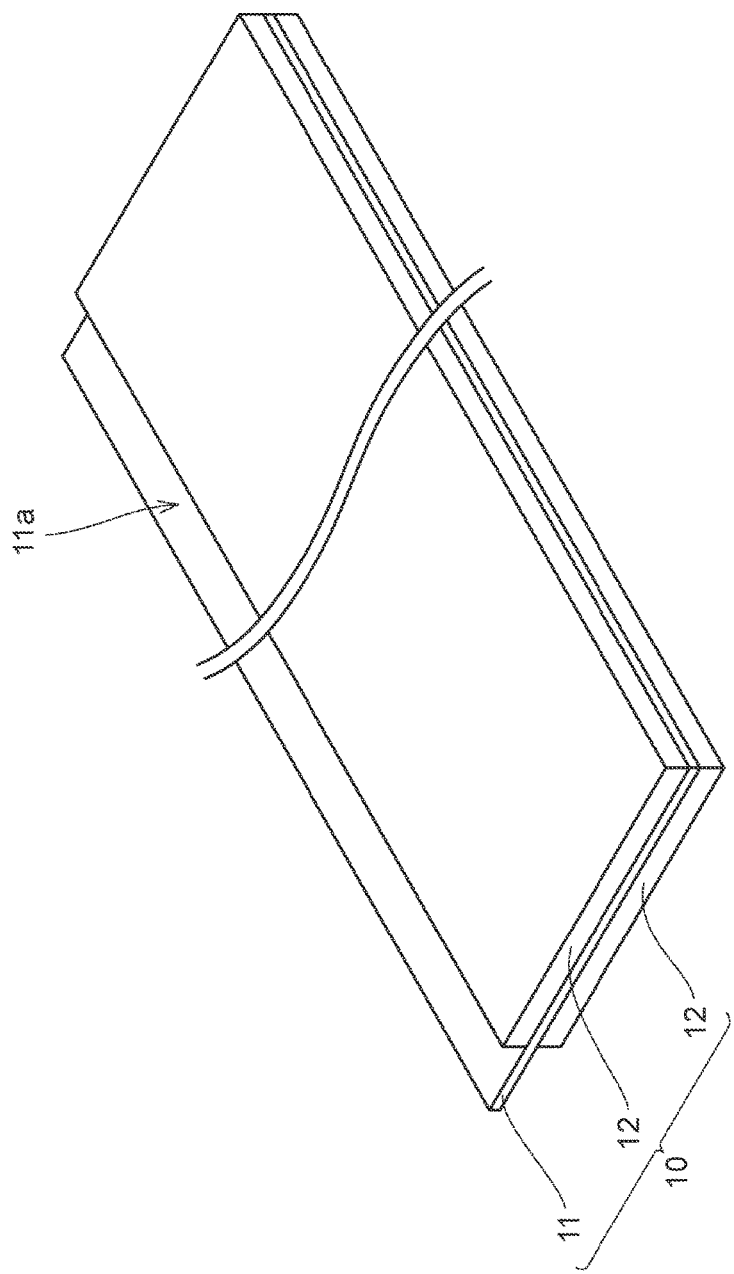
FIG. 5 is a schematic sectional view showing a configuration example of a positive electrode.

FIG. 5 is a schematic diagram showing a configuration example of the positive electrode. As shown in FIG. 5, the positive electrode 10 is an elongated belt-shaped sheet member. The positive electrode 10 includes: a positive electrode current collector core 11; and a positive electrode mixture layer 12 that is formed on both main surfaces of the positive electrode current collector core 11. The positive electrode current collector core is formed of, for example, an Al foil. The thickness of the positive electrode current collector core is, for example, about 5 $\mu m$ to 25 $\mu m$. In the positive electrode 10, a core exposure portion 11a where the positive electrode current collector core 11 is exposed from the positive electrode mixture layer 12 is a portion for connection with the positive electrode terminal 70 (refer to FIGS. 1 and 2).

The positive electrode mixture layer may contain a positive electrode active material, a conductive material, and a binder. The thickness of the positive electrode mixture layer is, for example, about 20 $\mu m$ to 100 $\mu m$. The positive electrode mixture layer contains, for example, 80 mass % to 98 mass % of the positive electrode active material. The positive electrode active material is not particularly limited. As the positive electrode active material, for example, $LiCoO_2$, $LiNiO_2$, a compound represented by the formula $LiNi_aCo_bO_2$ (wherein, a+b=1, 0<a<1, and 0<b<1), $LiMnO_2$, $LiMn_2O_4$, a compound represented by the formula $LiNi_aCo_bMn_cO_2$ (wherein, a+b+c=1, 0<a<1, 0<b<1, and 0<c<1), or $LiFePO_4$ may be used.

The positive electrode mixture layer contains, for example, 1 mass % to 10 mass % of the conductive material. The conductive material may be a carbon black such as acetylene black (AB) or thermal black. The positive electrode mixture layer contains, for example, 1 mass % to 10 mass % of the binder. The binder may be, for example, polyvinylidene fluoride (PVDF) or polytetrafluoroethylene (PTFE).

[Separator]

The separator 40 is an elongated belt-shaped film member. The separator prevents contact between the positive electrode and the negative electrode while allowing permeation of Li ions. For example, the separator is formed of a microporous membrane such as polyethylene (PE) or polypropylene (PP). The thickness of the separator may be, for example, 5 $\mu m$ to 40 $\mu m$. The pore size and porosity of the separator may be appropriately adjusted such that the air permeability is a desired value.

The separator may have a single-layer structure or a multi-layer structure. For example, the separator may have a single-layer structure including a PE microporous membrane or a three-layer structure in which a PE microporous membrane and a PP microporous membrane are laminated in order of PP/PE/PP.

A heat resistance layer may be formed on a surface of the separator. For example, the heat resistance layer is formed of inorganic particles such as alumina or a heat-resistant resin such as aramid.

[Electrolytic Solution]

The electrolytic solution is a liquid electrolyte in which a supporting electrolyte is dissolved in an aprotic solvent. Examples of the aprotic solvent which can be used include cyclic carbonates such as ethylene carbonate (EC), propylene carbonate (PC), butylene carbonate (BC), and γ-butyrolactone (γBL); and chain carbonates such as dimethyl carbonate (DMC), ethyl methyl carbonate (EMC), and diethyl carbonate (DEC). Among these aprotic solvents, two or more kinds may be mixed with each other to obtain a mixed solvent. A volume ratio of a cyclic carbonate to a chain carbonate (cyclic carbonate:chain carbonate) in the mixed solvent may be about 1:9 to 5:5. In the above-described range, electrical conductivity and electrochemical stability are well-balanced.

Examples of the supporting electrolyte include $LiPF_6$, $LiBF_4$, $LiClO_4$, $LiAsF_6$, $Li[(FSO_2)_2N]$ (also abbreviated as "LiFSI"), $Li[(CF_3SO_2)_2N]$ (also abbreviated as "LiTFSI"), and $Li[CF_3SO_3]$. The electrolytic solution may contain two or more kinds of supporting electrolytes. As the supporting electrolyte according to the embodiment, $LiPF_6$ and LiFSI are particularly preferable. The concentration of the supporting electrolyte is preferably about 0.5 mol/L to 2.0 mol/L, more preferably about 0.8 mol/L to 1.4 mol/L, and still more preferably about 1.0 mol/L to 1.2 mol/L. In the above-described range, storage characteristic and input and output characteristics are well-balanced.

In addition to the above-described components, the electrolytic solution may contain various kinds of additives. Examples of the additives include Li salts containing an oxalato complex as an anion such as $Li[(C_2O_4)_2B]$ (also abbreviated as "LiBOB"), $Li[(C_2O_4)BF_2]$, and $Li[(C_2O_4)_2PF_2]$, vinylene carbonate (VC), fluoroethylene carbonate (FEC), ethylene sulfite (ES), propane sultone (PS), and $Li[PO_2F_2]$, cyclohexylbenzene (CHB), and biphenyl (BP).

[Method of Manufacturing Nonaqueous Electrolyte Secondary Battery]

Figure 6:
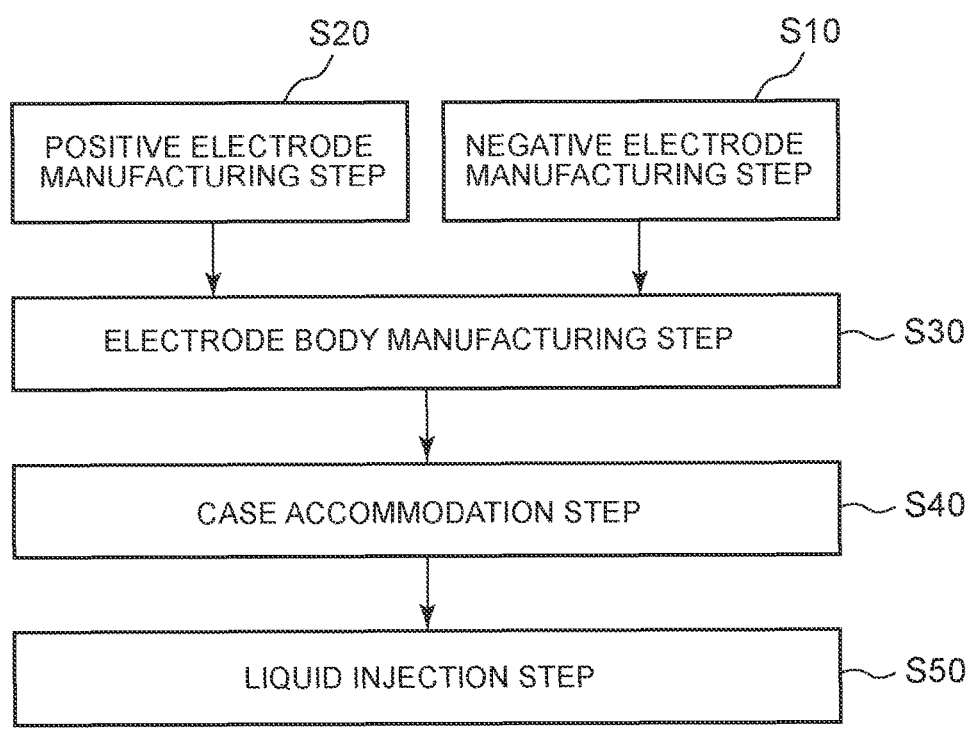
FIG. 6 is a flowchart showing the summary of a method of manufacturing a nonaqueous electrolyte secondary battery according to an embodiment of the invention.

The above-described nonaqueous electrolyte secondary battery according to the embodiment can be manufactured using, for example, the following manufacturing method. FIG. 6 is a flowchart showing the summary of the manufacturing method. As shown in FIG. 6, the manufacturing method includes a negative electrode manufacturing step (S10), a positive electrode manufacturing step (S20), an electrode body manufacturing step (S30), a case accommodation step (S40), and a liquid injection step (S50). Hereinafter, each step will be described.

[Negative Electrode Manufacturing Step (S10)]

Figure 7:
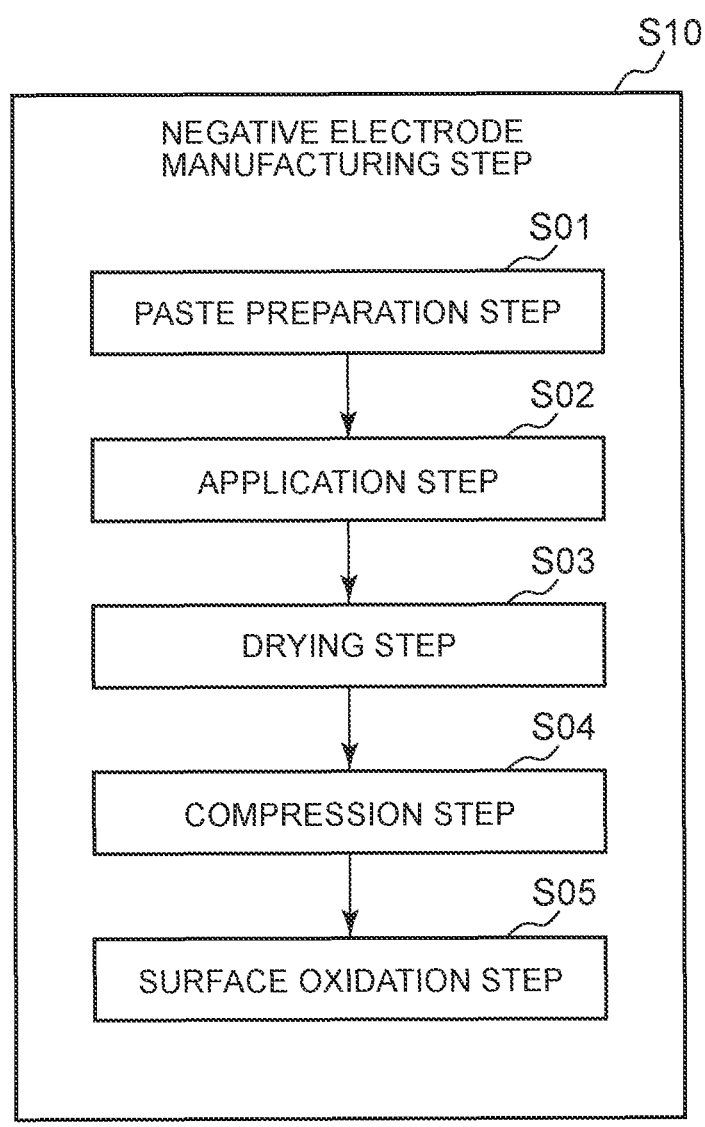
FIG. 7 is a flowchart showing the summary of a negative electrode manufacturing step according to the embodiment of the invention.

FIG. 7 is a flowchart showing the summary of the negative electrode manufacturing step. As shown in FIG. 7, the negative electrode manufacturing step includes a paste preparation step (S01), an application step (S02), a drying step (S03), a compression step (S04), and a surface oxidation step (S05). That is, the method of manufacturing a nonaqueous electrolyte secondary battery includes the paste preparation step, the application step, the drying step, and the surface oxidation step.

1. Paste Preparation Step (S01)

In the paste preparation step, a negative electrode mixture paste containing a diene rubber binder and a solvent is prepared. For example, the negative electrode mixture paste can be prepared by kneading a negative electrode active material, a thickener, a diene rubber binder, and a solvent with each other. For kneading, for example, a general kneading machine such as a planetary mixer can be used. A solid content concentration of the negative electrode mixture paste (hereinafter, abbreviated as "nonvolatile (NV) value") is one of the control factors of binder migration in the drying step described below. The NV value of the negative electrode mixture paste is adjusted to be, for example, about 50 mass % to 60 mass %.

2. Application Step (S02)

In the application step, the negative electrode mixture paste is applied to a negative electrode current collector core to form a coating film which is a negative electrode mixture layer. An application method is not particularly limited. For example, using a die coater or the like, the negative electrode mixture paste can be applied to a predetermined position on the negative electrode current collector core. The coating mass (the mass of the paste per unit area) can be appropriately changed depending on the NV value, the battery specification, and the like.

3. Drying Step (S03)

In the drying step, the coating film is dried to form a negative electrode mixture layer. At this time, in the embodiment, binder migration is intentionally caused to occur so as to control the distribution of the diene rubber binder.

For drying, for example, a hot air drying furnace can be used. Binder migration can be controlled by controlling, for example, a hot air drying temperature, an air flow rate, and a furnace length. The hot air drying temperature is, for example, about 50° C. to 100° C. As the hot air drying temperature increases, binder migration becomes severe, and the above-described m2/m1 may increase. As the NV value of the negative electrode mixture paste increases, binder migration becomes severe. These control factors are appropriately adjusted according to, for example, the coating mass of the coating film such that m2/m1 exceeds 1. Preferably, at this time, various conditions are adjusted such that m2/m1 is 1.5 to 5.

4. Compression Step (S04)

In the compression step, the dried negative electrode mixture layer is compressed to adjust the thickness of the negative electrode mixture layer. For example, using a rolling mill, the negative electrode mixture layer can be compressed. The compression step may be performed after the surface oxidation step described below.

5. Surface Oxidation Step (S05)

In the surface oxidation step, the surface of the negative electrode mixture layer is oxidized. As a result, a C=C bond contained in the main chain of the diene rubber binder is oxidized. Examples of the treatment method include a method of irradiating corona discharge, a method of irradiating ultraviolet rays, and a method of irradiating plasma. It is considered that ozone produced in the above-described methods has a strong oxidation action and oxidizes the C=C bond of the diene rubber binder. Accordingly, by exposing the surface of the negative electrode mixture layer directly to gas containing ozone, the C=C bond of the diene rubber binder present near the surface of the negative electrode mixture layer can be oxidized.

In a case where the method of irradiating ultraviolet rays is adopted, the wavelength of the ultraviolet rays is, for example, 185 nm. Among these, the method of irradiating corona discharge is particularly preferable as the treatment method according to the embodiment. Using this method, in a depth range of about 1 μm from the surface of the negative electrode mixture layer, the diene rubber binder can be locally oxidized.

In a case where the method of irradiating the surface of the negative electrode mixture layer with corona discharge is adopted, the energy of the corona discharge may be 1000 $kJ/m^2$ to 4800 $kJ/m^2$ per 1 mass % of the diene rubber binder. According to the investigation of the present inventors, under the above-described condition, the diene rubber binder present near the surface of the negative electrode mixture layer can be appropriately oxidized. That is, under the above-described condition, the above-described n3/n2 is likely to be adjusted to be lower than 1. The energy of the corona discharge may be 1400 $kJ/m^2$ to 4800 $kJ/m^2$ or 2500 $kJ/m^2$ to 4800 $kJ/m^2$ per 1 mass % of the diene rubber binder. By irradiating corona discharge under the above-described conditions, for example, n3/n2 can be adjusted to be 0.5 or lower.

Next, using a slitter or the like, the negative electrode mixture layer and the negative electrode current collector core are cut to have a predetermined dimension. Through the above-described steps, for example, the negative electrode 20 shown in FIG. 3 is completed.

[Positive Electrode Manufacturing Step (S20)]

In the positive electrode manufacturing step, for example, the positive electrode 10 shown in FIG. 5 is manufactured. A method of manufacturing the positive electrode 10 is not particularly limited. The positive electrode 10 can be manufactured, for example, as follows.

(1) A positive electrode mixture paste is prepared by kneading a positive electrode active material, a conductive material, a binder, and a solvent with each other using a planetary mixer or the like.

(2) Using a die coater or the like, the positive electrode mixture paste is applied to a predetermined position on a positive electrode current collector core and is dried. As a result, a positive electrode mixture layer is formed.

(3) Using a rolling mill or the like, the positive electrode mixture layer is compressed to adjust the thickness of the positive electrode mixture layer.

(4) Using a slitter or the like, the positive electrode mixture layer and the positive electrode current collector core are cut to have a predetermined dimension.

[Electrode Body Manufacturing Step (S30)]

In the electrode body manufacturing step, for example, the electrode body 80 shown in FIG. 2 is manufactured. First, the positive electrode 10 and the negative electrode 20 are laminated with the separators 40 interposed therebetween, and the components are wound around a winding axis Aw. As a result, an elliptical wound body is obtained. Further, the wound body is pressed using a flat pressing machine or the like. As a result, an electrode body having a flat external shape is obtained.

[Case Accommodation Step (S40)]

In the case accommodation step, as shown in FIG. 1, the electrode body 80 is accommodated in the battery case 50. First, the electrode body 80 is connected to the positive electrode terminal 70 and the negative electrode terminal 72 provided on the lid 54. The electrode body 80 is covered with a packing material (not shown) formed of PE. The electrode body 80 is inserted into the case body 52, and a fitted portion between the case body 52 and the lid 54 is joined by for example, laser welding.

[Liquid Injection Step (S50)]

In the liquid injection step, an electrolytic solution is injected into the battery case. For example, the electrolytic solution is injected through a liquid injection hole (not shown) provided on the battery case.

After the injection, the liquid injection hole is sealed with a stopper or the like to seal the battery case 50. Through the above-described steps, the nonaqueous electrolyte secondary battery according to the embodiment is completed.

The above-described nonaqueous electrolyte secondary battery according to the embodiment has satisfactory input and output characteristics and thus is suitable as a power supply for a vehicle. In particular, the nonaqueous electrolyte secondary battery is suitable as a power supply for a hybrid vehicle where input characteristics at a low temperature are important.

In the above-described embodiment, a square battery has been described as an example. However, the embodiment can also be applied to a cylindrical battery or a laminate battery. The electrode body is not limited to a wound electrode aggregate and may be a laminated (stacked) electrode aggregate.

Hereinafter, the embodiment will be described using Examples. However, the embodiment is not limited to the following Examples.

[Manufacturing of Negative Electrode]

Negative electrodes according to Samples Nos. 1 to 13 were manufactured as follows. In Table 1 of FIG. 11, for example, samples with No. to which the symbol "*" is attached, for example, "8*" are comparative examples, and other samples are examples according to the embodiment.

[Sample No. 1]

1. Negative Electrode Manufacturing Step (S10)

The following materials were prepared.

Negative electrode active material: carbon-coated spherical natural graphite (BET: about 6 $m^2/g$)

Thickener: CMC diene rubber

Binder: SBR

Solvent: water

Negative electrode current collector core: Cu foil (thickness: 10 μm)

Here, "carbon-coated spherical natural graphite" refers to composite particles obtained by coating spherical natural graphite particles with amorphous carbon. "BET" refers to a specific surface area measured using a BET method.

1-1. Paste Preparation Step (S01)

The negative electrode active material, CMC, SBR, and water were put into a mixing container of a planetary mixer and were kneaded with each other for a predetermined amount of time. As a result, a negative electrode mixture paste having a NV value of 58 mass % was prepared. In the negative electrode mixture paste, a mixing ratio (mass ratio; negative electrode active material:CMC:SBR) of the solid components was 97.5:1.0:1.5.

1-2. Application Step (S02)

Using a die coater, the negative electrode mixture paste obtained as described above was applied to predetermined positions on both main surfaces of the negative electrode current collector core. As a result, a coating film was formed.

1-3. Drying Step (S03)

Next, the coating film and the negative electrode current collector core were put into a hot air drying furnace, and the coating was dried while causing binder migration to occur. As a result, a negative electrode mixture layer was formed. At this time, the hot air drying temperature was set to 50° C.

1-4. Compression Step (S04)

Using a rolling mill or the like, the negative electrode mixture layer was compressed to adjust the thickness thereof. The thickness of the negative electrode mixture layer was 35 μm.

1-5. Surface Oxidation Step (S05)

Using a corona treatment device, a surface of the negative electrode mixture layer was irradiated with corona discharge. The energy of the corona discharge was 2500 $kJ/m^2$ per 1 mass % of SBR. As a result, a C=C bond of SBR present near the surface of the negative electrode mixture layer was oxidized.

Next, using a slitter or the like, the negative electrode mixture layer and the negative electrode current collector core were cut to have a predetermined dimension. As a result, the negative electrode 20 shown in FIG. 3 was obtained.

[Samples Nos. 2 to 13]

Negative electrodes according to Samples Nos. 2 to 13 were obtained using the same method as in Sample No. 1, except that various manufacturing conditions were changed as shown in Table 1 of FIG. 11. As shown in Table 1, in Nos. 8*, 9*, and 11*, the corona treatment, that is, the fourth step was not performed.

[Evaluation of Negative Electrode Mixture Layer]

Using the above-described method, a section of the negative electrode mixture layer in a thickness direction and the surface of the negative electrode mixture layer were provided for EPMA to calculate "m2/m1" and "n3/n2". The results are shown in Table 1 of FIG. 11.

[Manufacturing of Nonaqueous Electrolyte Secondary Battery]

Using the negative electrodes according to the respective samples obtained as described above, nonaqueous electrolyte secondary batteries were manufactured as follows.

2. Positive Electrode Manufacturing Step (S20)

The following materials were prepared.

Positive electrode active material: $LiNi_{1/3}Co_{1/3}Mn_{1/3}O_2$
Conductive material: AB
Binder: PVDF
Solvent: NMP
Positive electrode current collector core: Al foil (thickness: 15 μm)

The positive electrode active material, AB, PVDF, and NMP were put into a mixing container of a planetary mixer and were kneaded with each other for a predetermined amount of time. As a result, a positive electrode mixture paste was prepared. In the positive electrode mixture paste, a mixing ratio (mass ratio; positive electrode active material: AB:PVDF) of the solid components was 90:8:2.

Using a die coater, the positive electrode mixture paste was applied to predetermined positions on both main surfaces of the positive electrode current collector core. By drying the coating film, a positive electrode mixture layer was formed. Using a rolling mill, the positive electrode mixture layer was rolled to adjust the thickness thereof. Using a slitter, the positive electrode mixture layer and the positive electrode current collector core were cut to have a predetermined dimension. As a result, the positive electrode 10 shown in FIG. 5 was obtained.

3. Electrode Body Manufacturing Step (S30)

A separator substrate (thickness: 20 μm) having a three-layer structure in which a PP microporous membrane and a PE microporous membrane were laminated in order of PP/PE/PP was prepared. A paste containing alumina particles and an acrylic resin was applied to a surface of the separator substrate and was dried to form a heat resistance layer thereon. As a result, a separator was obtained.

Using a winding device, as shown in FIG. 2, the positive electrode 10 and the negative electrode 20 were laminated with the separators 40 interposed therebetween, and the components were wound around the winding axis Aw. As a result, an elliptical wound body was obtained. The wound body is pressed using a flat pressing machine or the like. As a result, the flat electrode body 80 was obtained.

During the manufacturing of the electrode body, adhesion of the negative electrode mixture layer was evaluated. The results are shown in Table 1 of FIG. 11. In Table 1, "H" represents high adhesion, and "L" represents low adhesion and implies that the mixture was peeled off during winding.

4. Case Accommodation Step (S40)

As shown in FIG. 1, the battery case 50 was prepared including: the lid 54 on which the positive electrode terminal 70 and the negative electrode terminal 72 are provided; and the case body 52. The electrode body 80 was connected to the positive electrode terminal 70 and the negative electrode terminal 72. The electrode body 80 was covered with a packing material formed of PE. The electrode body 80 was inserted into the case body 52, and a fitted portion between the case body 52 and the lid 54 was joined by for example, laser welding.

5. Liquid Injection Step (S50)

Aprotic solvents EC, DMC, and EMC were mixed with each other such that a volume ratio (EC:DMC:EMC) was 3:4:3. As a result, a mixed solvent was obtained. $LiPF_6$ was dissolved in the mixed solvent such that the concentration thereof was 1.0 mol/L. As a result, an electrolytic solution was prepared.

A predetermined amount of the electrolytic solution was injected through a liquid injection hole of the battery case. The liquid injection hole was sealed with a stopper to seal the battery case. In this way, nonaqueous electrolyte secondary batteries (rated capacity: 4 Ah) using the negative electrodes according to Samples Nos. 1 to 13 were manufactured.

[Evaluation of Battery Performance]

The respective batteries obtained as described above were evaluated using the following method.

1. Measurement of Battery Capacity

The initial capacity (discharge capacity) of each of the batteries was measured under the following charging and discharging conditions.

Measurement temperature: 25° C.
CCCV Charging
 CC current: 2.8 A
 CV voltage: 4.1 V
 Total charging time: 3 hours
CCCV Discharging
 CC current: 2.0 A
 CV voltage: 3.0 V
 Total discharging time: 4 hours 2. Low-Temperature Pulse Cycle Test The limiting current was measured in the following procedure. The results are shown in Table 1 of FIG. 11 and FIG. 8. The results show that, as the limiting current increases, input characteristics at a low temperature are improved.

(1) The charging depth of the battery was adjusted to 60% at 25° C.

(2) The battery was put in a chamber set to −10° C., and pulse cycles were repeated under the following conditions.
Pulse Charging Conditions
 Charge current (64 A)×Time (20 seconds)
 Upper limit voltage: 4.15 V
Pulse Discharging Conditions
 Discharge current (64 A)×Time (20 seconds)
 Lower limit voltage: 3.00 V (3) After 50 cycles, the capacity after cycles was measured using the same method as in "1. Measurement of Battery Capacity". The capacity retention was calculated by dividing the capacity after cycles by the initial capacity.

(4) In a case where the capacity retention was 98% or higher, the charge current in "Pulse Charging Conditions" described above was increased by 2 A. For example, 64 A+2 A=66 A. Under the above conditions, 50 cycles were further performed. This operation was repeated until the capacity retention was lower than 98%. When the capacity retention was lower than 98%, the charge current was measured and set as "limiting current".

3. Measurement of Normal-Temperature IV Resistance

The IV resistance at a normal temperature was measured in the following procedure. The results are shown in Table 1 of FIG. 11 and FIG. 9. The results show that, as the IV resistance decreases, output characteristics at a normal temperature are improved.

(1) The charging depth of the battery was adjusted to 60% at 25° C.

(2) Pulse discharging was performed at 25° C. under conditions of 125 A×10 seconds to measure a voltage drop amount.

(3) The voltage drop amount was divided by a current (125 A) to calculate a IV resistance.

4. High-Temperature Storage Test

The capacity retention after high-temperature storage was measured in the following procedure. The results are shown in Table 1 of FIG. 11 and FIG. 10. The results show that, as the capacity retention increases, input and output characteristics after storage are improved.

(1) The battery was charged by CCCV charging (CC current: 2.8 A, CV voltage: 3.88 V, total charging time: 2 hours).

(2) The battery was put in a chamber set to 60° C. and was stored for 30 days.

(3) After 30 days, the battery was extracted from the chamber, and the recovery capacity (return capacity) thereof was measured using the same method as in "1. Measurement of Battery Capacity".

(4) The capacity retention was calculated by dividing the recovery capacity by the initial capacity.

[Results and Discussion]

It can be seen from Table 1 of FIG. 11 that, in a sample in which m2/m1 is higher than 1 (that is, the abundance of SBR in the second region is higher than that in the first region) and in which n3/n2 is lower than 1 (that is, the third region contains SBR having an oxidized C=C bond in the main chain thereof), more satisfactory input and output characteristics are exhibited than a sample which does not satisfy the above-described conditions.

It is presumed that the reason for the results is the synergistic effect of the following (1) to (3).

(1) By reducing the SBR content in the first region, electrons are easily exchanged between the negative electrode mixture layer and the negative electrode current collector core, and input and output characteristics at a normal temperature are improved.

(2) By distributing a large amount of SBR in the second region, during high-temperature storage, a side reaction between the negative electrode active material and the electrolytic solution is suppressed, and a decrease in input and output characteristics after storage is suppressed.

(3) By oxidizing the C=C bond of SBR in the third region and cracking the SBR film formed by binder migration, input and output characteristics at a low temperature are significantly improved.

Figure 8:
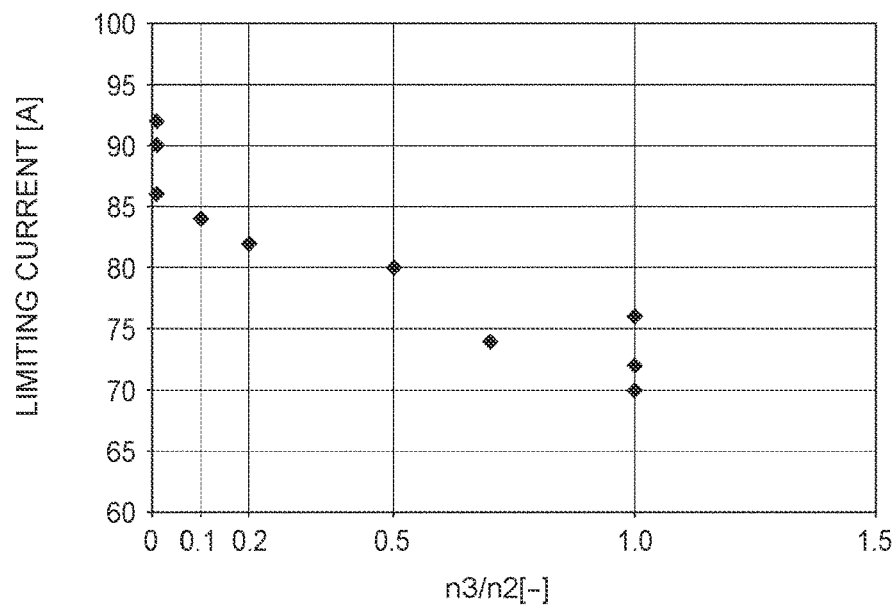
FIG. 8 is a graph showing the results of a low-temperature pulse cycle test.

FIG. 8 is a graph showing the results of a low-temperature pulse cycle test. In FIG. 8, the horizontal axis represents n3/n2 in Table 1 of FIG. 11, and the vertical axis represents the limiting current. It can be seen from FIG. 8 that, by controlling n3/n2 to be lower than 1, the limiting current can be increased, that is, input characteristics at a low temperature can be improved. Further, it can be seen that, in a case where n3/n2 is 0.5 or lower, the improvement is particularly significant. Accordingly, it can be said that n3/n2 is preferably 0.5 or lower.

Figure 9:
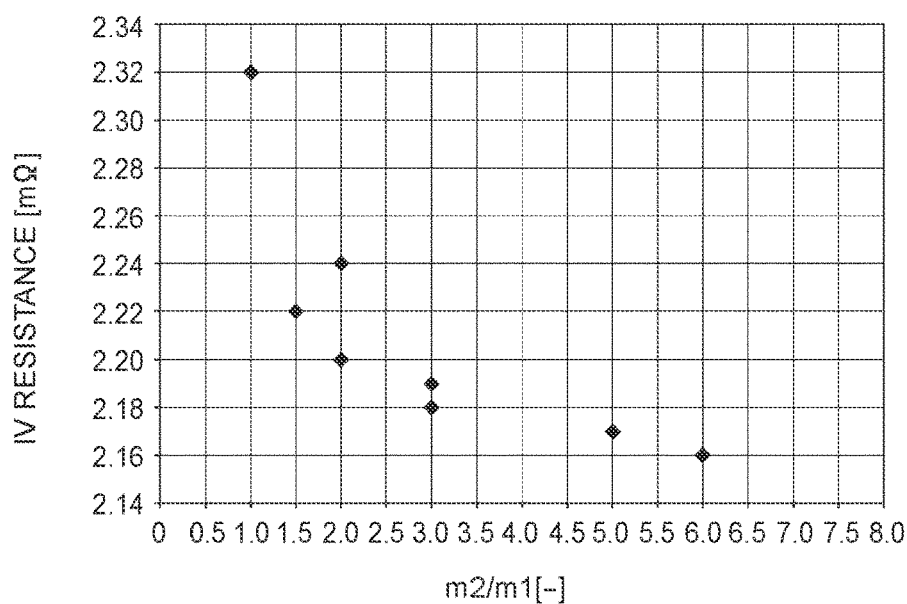
FIG. 9 is a graph showing the results of measuring a normal-temperature IV resistance.

FIG. 9 is a graph showing the results of measuring a normal-temperature IV resistance. In FIG. 9, the horizontal axis represents m2/m1 in Table 1 of FIG. 11, and the vertical axis represents the IV resistance. It can be seen from FIG. 9 that, by controlling m2/m1 to be higher than 1, the IV resistance can be reduced, that is, output characteristics at a normal temperature can be improved. Further, it can be seen that, in a case where m2/m1 is 1.5 or higher, the improvement is particularly significant.

Figure 10:
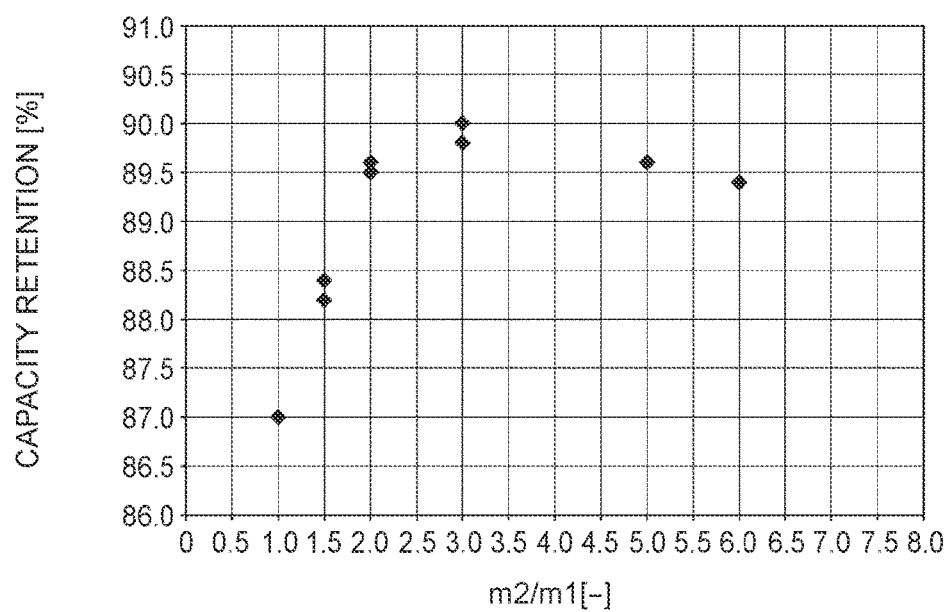
FIG. 10 is a graph showing the results of a high-temperature storage test.

FIG. 10 is a graph showing the results of a high-temperature storage test. In FIG. 10, the horizontal axis represents m2/m1 in Table 1 of FIG. 11, and the vertical axis represents the capacity retention. It can be seen from FIG. 10, by controlling m2/m1 to be higher than 1, the capacity retention can be improved, that is, output characteristics after storage can be improved. Further, it can be seen that, in a case where m2/m1 is 1.5 or higher, the improvement is particularly significant.

It can be said based on the above result that m2/m1 is preferably 1.5 or higher. However, as can be seen from Table 1 of FIG. 11, in Sample No. 12 in which m2/m1 is 6, the mixture material is peeled off during manufacturing due to a decrease in adhesion. Accordingly, m2/m1 is preferably lower than 6 and more preferably 5 or lower.

The embodiment and Examples disclosed herein are merely exemplary in all respects and are not particularly limited. The scope of the invention is defined not by the above description but by claims, and equivalent meanings to claims and modifications within claims are intended to be embraced therein.

What is claimed is:

1. A nonaqueous electrolyte secondary battery comprising:
    a negative electrode current collector core; and
    a negative electrode mixture layer that is formed on the negative electrode current collector core, wherein
    the negative electrode mixture layer contains a diene rubber binder, and
    when a section of the negative electrode mixture layer in a thickness direction is divided into a first region, a second region, and a third region from a negative electrode current collector core side by trisecting the negative electrode mixture layer in the thickness direction, an abundance of the diene rubber binder in the second region is greater than an abundance of the diene rubber binder in the first region, the abundance of the diene rubber binder in the second region is greater than an abundance of the diene rubber binder in the third region, and the third region further contains a diene rubber binder having an oxidized carbon-carbon double bond.

2. The nonaqueous electrolyte secondary battery according to claim 1, wherein m2/m1 is 1.5 to 5 where the abundance of the diene rubber binder in the first region is represented by m1, and when the abundance of the diene rubber binder in the second region is represented by m2.

3. The nonaqueous electrolyte secondary battery according to claim 1, wherein n3/n2 is 0.01 to 0.5 where an abundance per unit sectional area of a carbon-carbon double bond derived from the diene rubber binder in the second region is represented by n2, and an abundance per unit sectional area of a carbon-carbon double bond derived from the diene rubber binder on a surface of the third region is represented by n3.

4. The nonaqueous electrolyte secondary battery according to claim 1, wherein the negative electrode mixture layer contains 1.5 mass % to 2.0 mass % of the diene rubber binder.

5. The nonaqueous electrolyte secondary battery according to claim 1, wherein the diene rubber binder contains styrene-butadiene rubber.

* * * * *